US009111208B2

(12) United States Patent
Heo et al.

(10) Patent No.: US 9,111,208 B2
(45) Date of Patent: Aug. 18, 2015

(54) INTERNAL INTERFACE OF IMAGE FORMING APPARATUS

(71) Applicant: Samsung Electronics Co., Ltd., Suwon-si (KR)

(72) Inventors: Kyung-Lan Heo, Gunpo-si (KR); Ki-hong Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/332,853

(22) Filed: Jul. 16, 2014

(65) Prior Publication Data

US 2015/0022839 A1    Jan. 22, 2015

(30) Foreign Application Priority Data

Jul. 16, 2013 (KR) .................. 10-2013-0083436

(51) Int. Cl.
*H04N 1/04* (2006.01)
*G06K 15/00* (2006.01)
*G06F 3/12* (2006.01)
*G06F 13/00* (2006.01)

(52) U.S. Cl.
CPC .......... *G06K 15/4045* (2013.01); *G06F 3/1209* (2013.01); *G06F 3/1236* (2013.01); *G06F 3/1279* (2013.01); *G06F 3/1284* (2013.01); *G06F 13/00* (2013.01)

(58) Field of Classification Search
CPC . G06K 15/4045; G06F 3/1236; G06F 3/1209; G06F 3/1279; G06F 3/1284
USPC ................... 358/1.13, 1.15, 1.9, 505
See application file for complete search history.

(56) References Cited

U.S. PATENT DOCUMENTS 7,788,428 B2    8/2010    Melin
2008/0186403 A1*  8/2008   Douillet .................. 348/461

FOREIGN PATENT DOCUMENTS

JP    2011-524096    8/2011

* cited by examiner

*Primary Examiner* — Houshang Safaipour
(74) *Attorney, Agent, or Firm* — Staas & Halsey LLP

(57) ABSTRACT

An image forming apparatus is provided. The image forming apparatus includes a communication interface configured to receive printing data and an image forming unit configured to perform a printing operation by using the received printing data. In addition, the communication interface includes a communication controller configured to support a first interface method and a second interface method, and include a first pin port for communication in the first interface method and a second pin port for communication in the second interface method, a first connector configured to be connected to one of the first pin port and the second pin port, and a second connector configured to be connected to the first pin port or the second pin port which is not connected to the first connector.

12 Claims, 8 Drawing Sheets

INTERNAL INTERFACE OF IMAGE FORMING APPARATUS

CROSS-REFERENCE TO RELATED APPLICATIONS

This application claims priority benefit under 35 U.S.C. §119 from Korean Patent Application No. 10-2013-0083436, filed on Jul. 16, 2013 in the Korean Intellectual Property Office, the disclosure of which is incorporated herein by reference in its entirety.

BACKGROUND

1. Field

Embodiments generally relate to an internal interface of an image forming apparatus, and more particularly, to an internal interface of an image forming apparatus capable of exchanging data with an external apparatus by simultaneously using a plurality of interface methods supported by a communication interface of the image forming apparatus.

2. Description of the Related Art

Even until the 1990s, types of interface used in connecting a computer and a peripheral device were various, and thus methods of connecting the computer and the peripheral device were also various. In this regard, both of users and manufacturers needed a universal interface. According to this need, a universal serial bus (USB) was developed.

The USB has evolved continuously from a version 1.0 to a current version 3.0. Transmission speed thereof has been improved from 12 Mbps to 5 Gbps, and power supply capacity of a port has been enhanced to 900 mA enough to operate a high-power peripheral device without external power.

Each version of the USB uses a port in a same form, and thus, even when devices using a different version are connected to each other, they operate normally. However, the version 3.0 has a form where a cable of an existing version and a cable which is exclusive for USB 3.0 version are combined, in order to support the USB versions 1.1 through 2.0.

FIG. 1 is a view for explaining an image forming apparatus which supports an interface method of the USB version 3.0.

The image forming apparatus includes an image forming unit 10, a communication interface 20, a communication controller 21, a connector 23, a first data line 25, and a second data line 27.

Herein, the communication controller 21 may communicate and exchange data with an external apparatus by using one of the existing USB versions 1.1 through 2.0 and the USB 3.0 version.

For example, when an external apparatus supporting the USB version 3.0 is connected to the connector 23, it is connected to the communication controller 21 through the first data line 25, and exchanges data, and when an external apparatus supporting the USB versions 1.1 through 2.0 is connected to the connector 23, it is connected to the communication controller 21 through the second data line 27, and exchanges data.

That is, when the external apparatus supporting the USB version 3.0 is connected to the connector 23, only the first data line 25 is activated to exchange data, and when the external apparatus supporting the USB versions 1.1 through 2.0 is connected to the connector 23, only the second data line 27 is activated to exchange data.

As such, although the image forming apparatus included a plurality of data lines and the communication controller 21 supporting both of the USB versions 1.1 through 2.0 and the USB version 3.0, only one external apparatus was able to be connected to the connector 23 at a time since there is only one connector 23.

Hence, in order to increase a number of connector of the image forming apparatus, a method of increasing the number of the connector up to 127 by adding a hub chip to the image forming apparatus may be considered, but the method has a problem of increasing cost and system complexity.

Accordingly, a necessity of simultaneously connecting two external apparatuses to a communication controller which supports both of the USB versions 1.1 through 2.0 and the USB version 3.0 by increasing the number of connector without a hub chip was raised.

SUMMARY

In an aspect of one or more embodiments, there is provided an image forming apparatus capable of simultaneously activating a plurality of interface methods supported by a communication interface by increasing the number of connector without a hub chip.

In an aspect of one or more embodiments, there is provided a communication interface configured to receive printing data and an image forming unit configured to perform a printing operation by using the received printing data. In addition, the communication interface includes a communication controller configured to support a first interface method and a second interface method, and include a first pin port for communication in the first interface method and a second pin port for communication in the second interface method, a first connector configured to be connected to one of the first pin port and the second pin port, and a second connector configured to be connected to the first pin port or the second pin port which is not connected to the first connector.

Herein, the first connector may be an exclusive connector of an external apparatus using the first interface method or the second interface method, and the second connector may be an exclusive connector of an external apparatus using an interface method different from an interface method supported by the first connector.

The image forming apparatus may further include a switch configured to connect the first connector to the first pin port or the second pin port selectively according to the interface method connected to the first connector.

The apparatus may further include a switch controller configured to control the switch. In addition, the switch controller may detect an interface method which is used by the external apparatus by detecting a signal inputted to the first connector or the second connector.

In addition, when an external apparatus using the first interface method is connected to the first connector, the switch controller may control the switch to connect the first connector to the first pin port, disconnect the second connector from the first pin port, and connect the second connector to the second pin port.

The second interface method may be a sub-version of the first interface method.

In an aspect of one or more embodiments, there is provided an image forming apparatus according to another exemplary embodiment includes a communication interface configured to receive printing data and an image forming unit configured to perform a printing operation by using the received printing data. In addition, the communication interface includes a switch, a communication controller configured to support a first interface method and a second interface method, and comprise a first pin port for communication in the first interface method and a second pin port for communication in the second interface method, a first connector configured to be connected to the first pin port and be connected to the second pin port through the switch, and a second connector configured to be connected to the second pin port through the switch.

The first connector may be a connector configured to connect an external apparatus using the first interface method or the second interface method, and the second connector may be an exclusive connector of an external apparatus using the second interface method.

When an external apparatus using the first interface method is connected to the first connector, the switch may disconnect the first connector from the second pin port, and may connect the second connector to the second pin port.

When an external apparatus using the second interface method is connected to the first connector, the switch may connect the first connector to the second pin port, and may disconnect the second connector from the second pin port.

The image forming apparatus may further include a switch controller configured to control the switch. In addition, the switch controller may detect an interface method which is used by the external apparatus by detecting a signal inputted to the first connector or the second connector.

The second interface method may be a sub-version of the first interface method.

In an aspect of one or more embodiments, there is provided an image forming apparatus including a communication interface which receives printing data; and an image forming unit which performs a printing operation by using the received printing data, wherein the communication interface includes a communication controller which supports a first interface method and a second interface method, and which comprises a first pin port for communication in the first interface method and a second pin port for communication in the second interface method; a first connector which connects to one of the first pin port and the second pin port; and a second connector which connects to the first pin port or the second pin port, wherein the first connector and the second connector are not connected to the first pin port at the same time, and wherein the first connector and the second connector are not connected to the second pin port at the same time.

In an aspect of one or more embodiments, there is provided an image forming apparatus including a communication interface which receives printing data; and an image forming unit which performs a printing operation by using the received printing data, wherein the communication interface includes a switch; a communication controller which supports a first interface method and a second interface method, and comprise a first pin port for communication in the first interface method and a second pin port for communication in the second interface method; a first connector which connects to the first pin port and which connects to the second pin port through the switch; and a second connector which connects to the second pin port through the switch.

As above, according to various exemplary embodiments, an internal interface of an image forming apparatus may increase the number of connector without a hub chip, and may achieve an effect of simultaneously using a plurality of interface methods supported by a communication interface.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
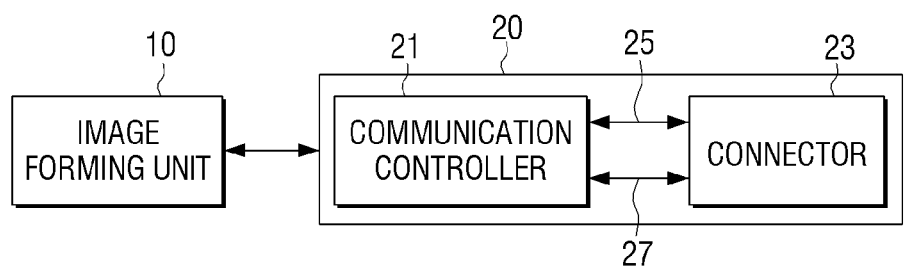
FIG. 1 is a view for explaining an image forming apparatus which supports an interface method of the USB version 3.0 in the related art.

Reference will now be made in detail to embodiments, examples of which are illustrated in the accompanying drawings, wherein like reference numerals refer to the like elements throughout. Embodiments are described below by referring to the figures.

Figure 2:
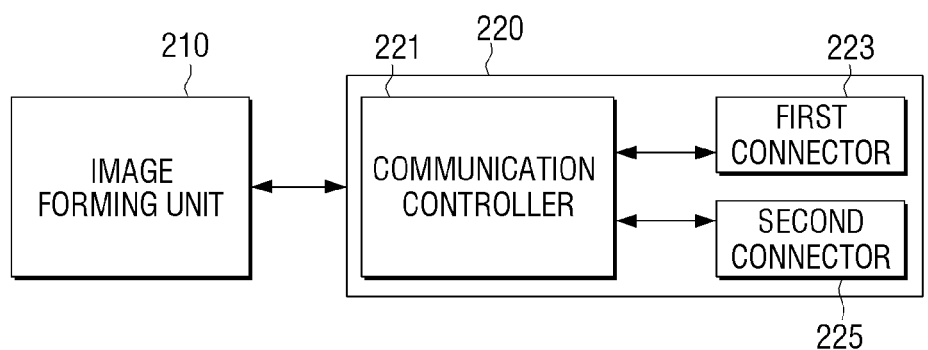
FIG. 2 is a view for explaining an image forming apparatus according to an exemplary embodiment.

FIG. 2 is a block diagram for explaining an image forming apparatus according to an exemplary embodiment.

As shown in FIG. 2, the image forming apparatus according to an exemplary embodiment includes an image forming unit 210 and a communication interface 220.

The image forming unit 210 performs a printing operation by using print data received from the communication interface 220.

For example, when the image forming unit 210 includes a scanner (not shown), a printing engine (not shown), or a modem (not shown), the image forming unit 210 may scan a document, print the document on a paper, or perform operations such as copying and transmitting and receiving a facsimile.

The communication interface 220 receives print data from an external apparatus.

As shown in FIG. 2, the communication interface 220 according to an exemplary embodiment includes a communication controller 221, a first connector 223, and a second connector 225.

The communication controller 221 supports a first interface method and a second interface method, and includes a first pin port for communication in the first interface method and a second pin port for communication in the second interface method.

In addition, the first connector 223 is connected to the first pin port or the second pin port of the communication controller 221, and the second connector 225 is connected to the second pin port different from the first connector or the first pin port.

The communication controller 221 may be implemented as a chip which supports an interface method of the USB version 3.0 and an interface method of the USB versions 1.1 through 2.0.

The communication controller 221 being implemented as a chip may include a plurality of pin ports, and may exchange data with an external apparatus by the interface method of the USB version 3.0 or the interface method of the USB versions 1.1 through 2.0 according to which pin receives input of data.

For example, when it is assumed that the first connector 223 is a connector for connecting to an external apparatus which exchanges data in the interface method of the USB version 3.0 (the first interface method), the first connector 223 may be connected to the first pin port for exchanging data by the interface method of the USB version 3.0 (the first interface) among a plurality of pin ports included in the communication controller 221.

In addition, when it is assumed that the second connector 225 is a connector for connecting to an external apparatus which exchanges data in the interface method of the USB versions 1.1 through 2.0 (the second interface method), the second connector 225 may be connected to the second pin port for exchanging data by the interface method of USB versions 1.1 through 2.0 (the second interface) among a plurality of pin ports included in the communication controller 221.

Although FIG. 2 illustrates that the communication controller 221 is connected to the first connector 223 and the second connector 225 through a single line for convenience in explanation, the communication controller 221 may be connected to the first connector 223 and the second connector 225 through a plurality of lines according to an interface method in implementation.

For example, when it is assumed that the first connector 223 is a connector for connecting to an external apparatus which supports the interface method of the USB version 3.0, the first connector 223 may be connected to the communication controller 221 through four lines.

In order to exchange data in the interface method of the USB version 3.0, the first connector 223 may be composed of four data lines of TX+, TX−, RX+, and RX− for exchanging data by using a differential signal.

By contrast, when it is assumed that the first connector 223 is a connector for connecting to an external apparatus which supports the interface method of the USB versions 1.1 through 2.0, the first connector 223 may be connected to the communication controller 221 through two lines.

The first connector 223 may be composed of two data lines of D+ and D− for exchanging data by the interface method of the USB versions 1.1 through 2.0.

As above, as the first connector 223 and the second connector 225 are connected to the first pin port and the second pin port of the communication controller 221 which supports a particular interface method, an effect of exchanging data with an external apparatus in an interface method supported by each connector by using two connectors without a hub chip.

Figure 3:
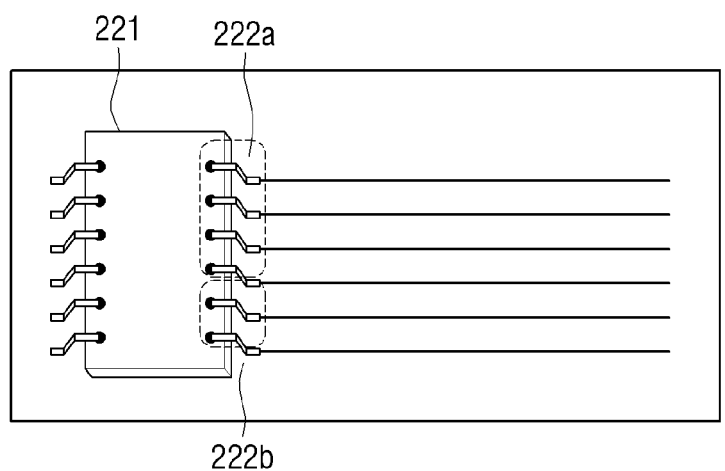
FIG. 3 is a view for explaining a method of connecting a pin port of a communication controller and a connector.

FIG. 3 is a view for explaining a method of connecting a pin port of the communication controller and a connector according to an exemplary embodiment.

The communication controller 221 according to an exemplary embodiment may exchange data with an external apparatus in the first interface method and the second interface method, and may be implemented as a single chip.

In addition, the communication controller 221 may include a plurality of pin ports (222a and 222b), and may communicate with an external apparatus in interface methods which vary according to a pin port where data is exchanged.

As explained above, the interface method of the USB versions 1.1 through 2.0 requires two data lines (D+ and D−), and the interface method of the USB version 3.0 requires four data lines (TX+, TX−, RX+, and RX−).

Hence, in an exemplary embodiment, it may be assumed that the first pin port 222a is a port for exchanging data in the interface method of the USB version 3.0, and the second pin port is a port for exchanging data in the interface method of the USB versions 1.1 through 2.0.

At this point, the first pin port 222a is connected to the first connector for connecting to an external apparatus which exchanges data in the first interface method, and the second pin port 222b is connected to the second connector for connecting to an external apparatus which exchanges data in the second interface method.

Accordingly, when an external apparatus is connected to the first connector, data is inputted or outputted through the first pin port 222a, and thus the data is exchanged in the first interface method. When the external apparatus is connected to the second connector, data is inputted or outputted through the second pin port 222b, and thus the data is exchanged in the second interface method.

Accordingly, when an external apparatus using the second interface method is connected to the first connector, it is not possible to exchange data between the image forming apparatus and the external apparatus.

Likewise, when an external apparatus using the first interface method is connected to the second connector, it is not possible to exchange data between the image forming apparatus and the external apparatus.

That is, the first connector is an exclusive connector for the external apparatus using the first interface method, and the second connector is an exclusive connector for the external apparatus using the second interface method.

However, when the first connector and the second connector according to an exemplary embodiment are the connectors for connecting a USB device, it may be difficult for a user to determine which version's USB interface method is supported by the first connector or the second connector.

The aforementioned problem is attributed to a same shape of USB connectors in different versions.

Accordingly, a color of the first connector and a color of the second connector may be implemented differently, and a sign which shows an interface method supported by each connector may be attached to each connector in implementation.

However, when a certain connector supports a particular interface method only, and does not operate normally when it is connected to an external apparatus using a different interface method, a user should distinguish and connect a connector to an external apparatus using an interface method supported by the connector, and thus the user may suffer inconvenience.

Figure 4:
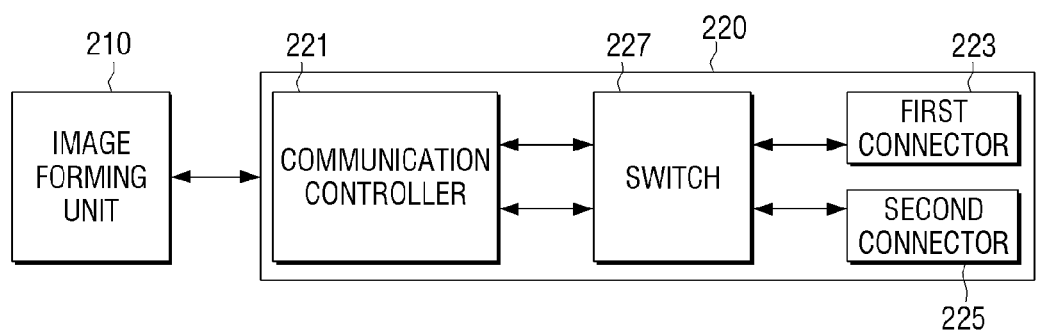
FIG. 4 is a view for explaining an image forming apparatus according to another exemplary embodiment.

Hence, FIG. 4 is a view for explaining an image forming apparatus which recognizes an interface method of an external apparatus to be connected to a connector, and connects the connector to a pin port supporting the interface method.

The image forming apparatus according to FIG. 4 may further include a switch 227 on top of the configurations of the image forming apparatus according to FIG. 2.

The description for the image forming unit 210, the communication interface 220, the communication controller 221, the firs connector 223, and the second connector 225 illustrated in FIG. 4 is the same as the description in FIG. 2, and thus it will be omitted here.

The switch 227 connects the first connector to the first pin port or the second pin port selectively according to an interface method of an external apparatus connected to the first connector 223.

At this point, the switch 227 may connect the second connector 225 to the first pin port where the first connector 223 is not connected or the second pin port.

In addition, the image forming apparatus according to an exemplary embodiment may further include a switch controller (not shown) configured to control the switch 227 to connect the first connector or the second connector to the first pin port or the second pin port according an interface method used by an external apparatus connected to each connector.

The switch controller (not shown) detects a signal which is inputted to a connector and determines an interface method used by an external apparatus.

For example, when an external apparatus using the interface method of the USB version 3.0 is connected to the first connector, a signal is inputted to TX+, TX−, RX+, and RX− lines used in the interface method of the USB version 3.0.

When the signal is inputted to the TX+, TX−, RX+, and RX− lines, the switch controller may determine that the external apparatus connected to the first connector 223 uses the interface method of the USB version 3.0, and may control the switch 227 to connect the first connector 223 to the first pin port or the second pin port supporting the interface method of the USB version 3.0.

In addition, the switch controller may control the switch 227 to disconnect the second connector 225 from the pin port where the first connector 223 is connected, and connect the second connector 225 to a pin port where the first connector 223 is not connected.

As above, as the switch controller determines an interface method used by an external apparatus connected to a connector, and connects the connector to a pin port which supports the interface method of the external apparatus, an effect of exchanging data in the interface method used by the external apparatus may be achieved even though a user selects a connector arbitrarily and connects an external apparatus thereto.

Figure 5:
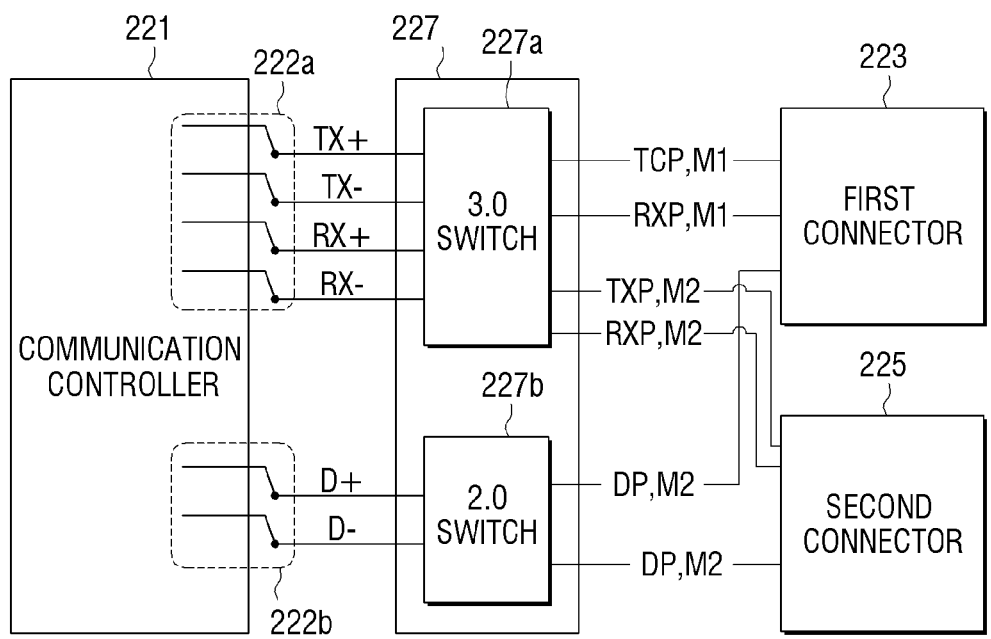
FIG. 5 is a view for explaining the image forming apparatus according to FIG. 4 more specifically.

FIG. 5 is a view for explaining the image forming apparatus according to the FIG. 4 specifically.

In an exemplary embodiment, it may be assumed that the first interface method is a method of the USB version 3.0, and the second interface method is a method of the USB versions 1.1 through 2.0.

In an exemplary embodiment, the switch 227 includes a 3.0 switch 227a and a 2.0 switch 227b configured to connect the first connector 223 and the second connector 225 to the first pin port 222a supporting the interface method of the USB version 3.0 or the second pin port 222b supporting the interface method of the USB versions 1.1 through 2.0.

The 3.0 switch 227a is connected to each connector by four data lines (TX+, TX−, RX+, and RX−), but in an present exemplary embodiment, it is explained that the 3.0 switch 227a may connected to each connector by two data lines, for convenience in explanation.

In addition, the 2.0 switch 227 is also connected to each connector by two data lines (D+ and D−), but in an exemplary embodiment, it is explained that the 2.0 switch 227b may connected to each connector by a single data line, for convenience in explanation.

In an exemplary embodiment, when an external apparatus using the interface method of the USB version 3.0 is connected to the first connector 223, a signal may be inputted to TXP, M1 and RXP, M1. The switch controller (not shown) detects the signal, and recognizes that the external apparatus connected to the first connector 223 uses the interface method of the USB version 3.0.

The switch controller (not shown) controls the 3.0 switch 227a based on the detected signal to connect the first connector 223 to the first pin port 222a supporting the interface method of the USB version 3.0.

In addition, the switch controller controls the 2.0 switch 227b to disconnect the first connector 223 from the second pin port 222b supporting the interface method of the USB versions 1.1 through 2.0.

By contrast, when an external apparatus using the interface method of the USB versions 1.1 through 2.0 is connected to the first connector 223, a signal is inputted to DP, M2 data line. The switch controller (not shown) detects the signal, and recognizes that the external apparatus connected to the first connector 223 uses the interface method of the USB versions 1.1 through 2.0.

The switch controller (not shown) controls the 2.0 switch 227b based on the detected signal to connect the first connector 223 to the second pin port 222b supporting the interface method of the USB versions 1.1 through 2.0.

As above, as the switch controller recognizes an interface method used by an external apparatus connected to a connector, and controls the switch to transmit data in the interface method, an effect of exchanging data in the interface method of the external apparatus may be achieved even though a user connects the external apparatus to an arbitrary connector.

Figure 6:
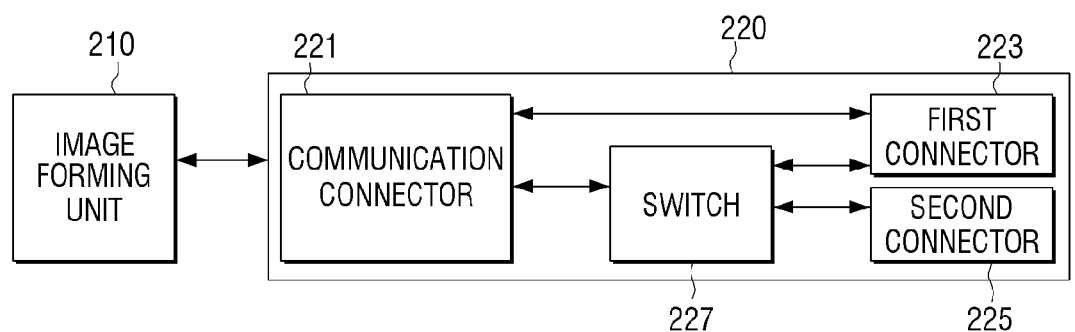
FIG. 6 is a view for explaining an image forming apparatus according to another exemplary embodiment.

FIG. 6 is a view for explaining an image forming apparatus according an exemplary embodiment.

Like the image forming apparatus in FIG. 4, the image forming apparatus in FIG. 6 includes the image forming unit 210, the communication interface 220, the communication controller 221, the first connector 223, the second connector 225, and the switch 227.

In addition, as explained above, the communication controller 221 supports the first interface methods and the second interface method which is a sub-version of the first interface method, includes the first pin port for the communication in the first interface method and the second pin port for communication in the second interface method, and may be implemented as a single chip.

However, unlike the image forming apparatus in FIG. 4, the first connector 223 is connected to the first pin port directly, and connected to the second pin port through the switch 227.

The first connector 223 is connected to both of the first pin port and the second pin port, and thus both of an external apparatus using the first interface method and an external apparatus using the second interface method may be connected to the first connector 223.

By contrast, the second connector 225 is connected to only the second pin port through the switch 227, and thus may exchange data only when an external apparatus using the second interface method is connected.

In an exemplary embodiment, operations of the switch 227 vary according to an interface method which an external apparatus connected to the first connector 223 uses.

For example, when an external apparatus which exchanges data in the first interface method is connected to the first connector 223, the switch 227 disconnects the first connector 223 from the second pin port, and connects the second connector 225 to the second pin port.

Accordingly, when an external apparatus using the first interface method is connected to the first connector 223, a user may connect an external apparatus using the second interface method to the second connector 225 to exchange data.

When the external apparatus using the second interface method is connected to the first connector 223, the switch 227 connects the first connector 223 to the second pin port, and disconnects the second connector 225 from the second pin port.

Accordingly, when the external apparatus using the second interface method is connected to the first connector 223, the external apparatus using the first interface method and the external apparatus using the second interface method may not be connected to the second connector 225.

However, according to the exemplary embodiment explained in FIG. 5, a user may obtain an effect of connecting and using the external apparatus using the first interface method or the second interface method to an arbitrary connector.

Figure 7:
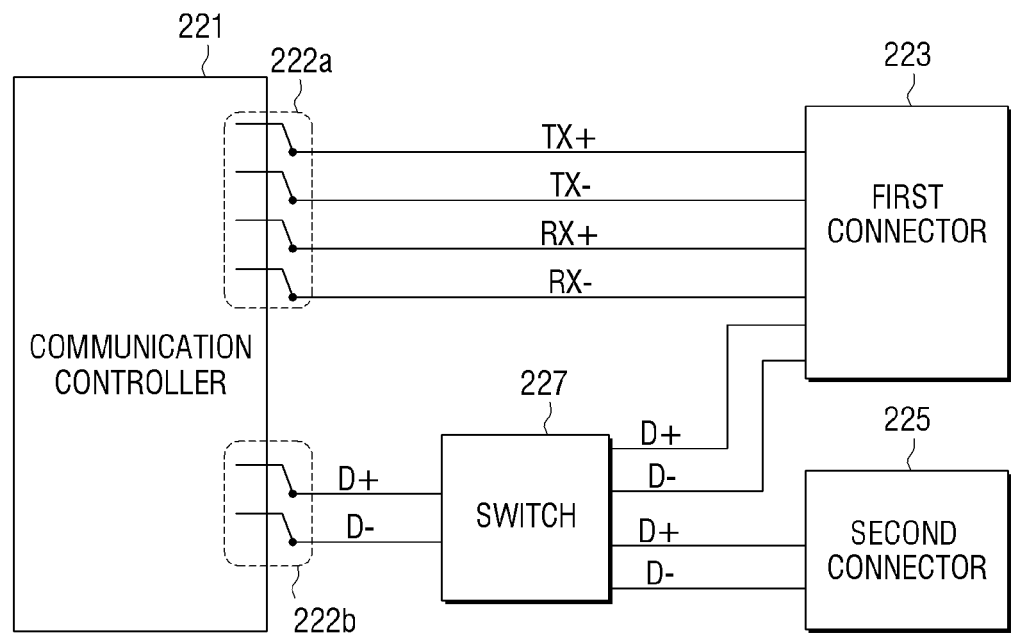
FIG. 7 is a view for explaining the image forming apparatus according to FIG. 6 more specifically.

FIG. 7 is a view for explaining the image forming apparatus in FIG. 6 more specifically.

In one or more embodiments, it is assumed that the first interface method is a method of the USB version 3.0, and the second interface method is a method of the USB versions 1.1 through 2.0.

The first connector 223 of the image forming apparatus in FIG. 7 may be connected to an external apparatus using the first interface method or the second interface method, while the second connector 225 may be connected to only an external apparatus which exchanges data in the second interface method.

In one or more embodiments, when an external apparatus which exchanges data in the first interface method (the method of the USB version 3.0) is connected to the first connector 223, a signal is inputted to the data lines of TX+, TX−, RX+, and RX−.

The switch controller (not shown) detects the signal, and controls the switch 227 to disconnect the first connector 223 form the second pin port 227b, and connect the second connector 225 to the second pin port 222b.

Hence, a user may connect and use the second connector 225 to an external apparatus which exchanges data in the second interface method.

By contrast, when an external apparatus which exchanges data in the second interface method is connected to the first connector 223, a signal is inputted to the data lines of D+ and D−. The switch controller (not shown) detects the signal, and recognizes that the external apparatus connected to the first connector 223 exchanges data by using the second interface method.

Hence, the switch controller (not shown) controls the switch 227 to connect the first connector 223 to the second pin port 222b, and disconnects the second connector 225 from the second pin port 222b.

In addition, in an exemplary embodiment, it has been explained that the first connector 223 may be connected to an external apparatus which exchanges data in the first interface method or the second interface method, and the second connector 225 may be connected to only an external apparatus which exchanges data in the second interface method, but the second connector 225 may be connected to an external apparatus which exchanges data in the first interface method or the second interface method according to a disposition of the switch 227 in implementation.

Figure 8:
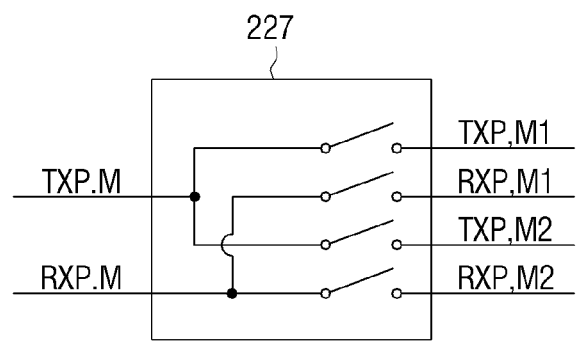
FIG. 8 is a view for explaining a switch according to an exemplary embodiment.

FIG. 8 is a view for explaining the switch 227 according to an exemplary embodiment specifically.

In an exemplary embodiment, it may be assumed that the switch 227 connects the first connector 223 or the second connector 225 to the first pin port 222a supporting the first interface method.

In addition, it may be assumed that the first interface method is a method of the USB version 3.0.

TXP, M illustrated in FIG. 8 refers to the TX+ data line and the TX− date line, and RXP, M refers to the RX+ data line and the TX− data line.

An exemplary embodiment describes the TXP, M and the RXP, M composed of two data lines as a single line.

In addition, TXP, M1, and RXP, M1 are connected to the first connector 223, and TXP, M2 and RXP, M2 are connected to the second connector 225. At this point, when an external apparatus which exchanges data in the first interface method is connected to the first connector 223, the switch controller (not shown) detects the signal, and controls the switch to connect the TXP, M1 and RXP, M1 data lines to the first pin port, and maintain an open state of the TXP, M2 and RXP, M2.

By contrast, when an external apparatus which exchanges data in the first interface method is connected to the second connector 225, the switch controller detects the signal, and controls the switch to connect the TXP, M2 and RXP, M2 data lines to the first pin port and, and maintain an open state of the TXP, M1 and RXP, M1 data lines.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus comprising:
a communication interface configured to receive printing data; and
an image forming unit configured to perform a printing operation by using the received printing data,
wherein the communication interface comprises:
a communication controller configured to support a first interface method and a second interface method;
a first connector configured to be connected to a first external apparatus which supports the first interface method through a first data line; and
a second connector configured to be connected to a second external apparatus which supports the first interface method through a first data line,
wherein the communication controller processes the received printing data and provides the processed printing data to the image forming unit when the printing data is received through the first connector and the second connector at the same time.

2. The apparatus as claimed in claim 1, wherein:
the communication controller comprises a first pin port for communication in the first interface method a second pin port for communication in the second interface method,
the first connector is configured to be connected to one of the first pin port and the second pin port and is an exclusive connector of the first external apparatus further using the second interface method, and
the second connector is configured to be connected to the first pin port or the second pin port and is an exclusive connector of the second external apparatus using an interface method different from an interface method supported by the first connector.

3. The apparatus as claimed in claim 2, further comprising:
a switch configured to connect the first connector to the first pin port or the second pin port selectively according to the interface method connected to the first connector.

4. The apparatus as claimed in claim 3, further comprising:
a switch controller configured to control the switch;
wherein the switch controller detects an interface method which is used by the first external apparatus and the second external apparatus by detecting a signal inputted to the first connector or the second connector.

5. The apparatus as claimed in claim 4, wherein when the first external apparatus using the first interface method is connected to the first connector, the switch controller controls the switch to connect the first connector to the first pin port, disconnect the second connector from the first pin port, and connect the second connector to the second pin port.

6. The apparatus as claimed in claim 1, wherein the second interface method is a sub-version of the first interface method.

7. An image forming apparatus comprising:
a communication interface configured to receive printing data; and
an image forming unit configured to perform a printing operation by using the received printing data, wherein the communication interface comprises:

a switch;

a communication controller configured to support a first interface method and a second interface method, and comprise a first pin port for communication in the first interface method and a second pin port for communication in the second interface method;

a first connector configured to be connected to the first pin port, configured to be connected to the second pin port through the switch and configured to be connected to a first external apparatus which supports the first interface method through a first data line; and a second connector configured to be connected to the second pin port through the switch and configured to be connected to a second external apparatus which supports the first interface method through the first data line, wherein the communication controller processes the received printing data and provides the processed printing data to the image forming unit when the printing data is received through the first connector and the second connector at the same time.

8. The apparatus as claimed in claim 7, wherein:

the first connector is a connector configured to connect the first external apparatus further using the second interface method, and the second connector is an exclusive connector of an external apparatus using the second interface method.

9. The apparatus as claimed in claim 7, wherein when the first external apparatus using the first interface method is connected to the first connector, the switch disconnects the first connector from the second pin port, and connects the second connector to the second pin port.

10. The apparatus as claimed in claim 7, wherein when the second external apparatus using the second interface method is connected to the first connector, the switch connects the first connector to the second pin port, and disconnects the second connector from the second pin port.

11. The apparatus as claimed in claim 9, further comprising:

a switch controller configured to control the switch, wherein the switch controller detects an interface method which is used by the first external apparatus and the second external apparatus by detecting a signal inputted to the first connector or the second connector.

12. The apparatus as claimed in claim 7, wherein the second interface method is a sub-version of the first interface method.

* * * * *